(12) United States Patent
Lee

(10) Patent No.: US 7,031,948 B2
(45) Date of Patent: Apr. 18, 2006

(54) REGULATION OF HIERARCHIC DECISIONS IN INTELLIGENT SYSTEMS

(76) Inventor: Shih-Jong J. Lee, 15418 SE. 53rd Pl., Bellevue, WA (US) 98006

( * ) Notice: Subject to any disclaimer, the term of this patent is extended or adjusted under 35 U.S.C. 154(b) by 793 days.

(21) Appl. No.: 09/972,057

(22) Filed: Oct. 5, 2001

(65) Prior Publication Data

US 2003/0069652 A1    Apr. 10, 2003

(51) Int. Cl.
 *G06F 15/18* (2006.01)
(52) U.S. Cl. ............................ 706/14; 706/12; 706/932
(58) Field of Classification Search .................. 706/14, 706/12, 932
 See application file for complete search history.

(56) References Cited

U.S. PATENT DOCUMENTS

| 5,892,801 | A * | 4/1999 | Schneider | 375/348 |
| 6,253,169 | B1 * | 6/2001 | Apte et al. | 704/9 |
| 6,684,186 | B1 * | 1/2004 | Beigi et al. | 704/246 |
| 6,748,356 | B1 * | 6/2004 | Beigi et al. | 704/245 |

OTHER PUBLICATIONS

Michael J. A. Berry, Data Mining Techniques, 1997, Wiley, 243-285.*

Breiman L., Friedman J.H., Olshen R.A. and Stone C.J., "Classification and Regression Trees", Chapman and Hall/CRC, 1984 pp18-58.

Quinlan, J. Ross, "Programs for Machine Learning", Morgan Kaufmann 1993 pp 35-43.

Freund, Y., R. E. Schapie, Iyer, R., Singer, Y. 1998 "An Efficient Boosting Algorithm for Combining Preferences", Machine Learning: Proceedings of the Fifteenth International Conference 1998.

* cited by examiner

*Primary Examiner*—Joseph P. Hirl

(57) ABSTRACT

A regulation method for decision tree construction is described wherein decision rules can be automatically adjusted between crisp and soft decisions. Starting with a conventional decision tree, additional statistics are stored at the terminal and non-terminal nodes during training and used during application to new samples. The regulation process allows automatic determination of tree structure. It also allows incremental updating of a regulation decision tree with graceful change to classification performance characteristics. Compound regulation decision trees are described for use to update the decision structure when new training input samples include new classes. Methods for pruning regulation decision trees, for focusing regulation decision trees, for determining optimal depth and regulation parameters and for determining optimal sample weighting are taught.

7 Claims, 10 Drawing Sheets

REGULATION OF HIERARCHIC DECISIONS IN INTELLIGENT SYSTEMS

TECHNICAL FIELD

This invention is related to intelligent systems, classifications and decision making and more particularly to regulating the quality of decision rules automatically.

BACKGROUND OF THE INVENTION

Many intelligent system applications such as data mining, automatic process control, automatic target recognition, intelligent database search, data warehousing, and machine vision perform decision making using rules derived from offline training or online learning. Prior art approaches can be used for decision rule generation. These include knowledge acquisition methods in expert systems, statistical discriminate analysis, Bayesian decision theory, Bayes belief networks, fuzzy systems, artificial neural networks, genetic algorithms, etc.

Several of the approaches are capable of generating complicated decision rules to optimize decisions for the training data and yield superior re-substitution (test on training data) results. In simple applications, almost all above approaches could result in reasonable performance. However, due to the dynamic nature of many applications, unforeseen conditions or data are often encountered online that challenge the decision rules created without the benefits of the new information. Decision rules specifically optimized for the earlier training data may fail on the new data. Thus, they lack robustness.

To overcome the difficulty of non-robust performance, prior art approaches divide available data into training and testing sets. They use the training set to generate decision rules and use the test set to evaluate the robustness of the decision rules generated from the training set. This approach could improve the robustness of the decision rules. However, it is inefficient since it generates decision rules from only partial data and most of them cannot use new data to update decision rules incrementally.

A Decision tree is a popular prior art set of decision rules. A typical decision tree classifier makes crisp decisions. That is, it makes decisions following a definitive path of decision structure and assigns a class unequivocally to an input sample. This method supports applications with discontinuous decision boundaries well and is desirable in classification applications where context switching is required around decision boundaries. However, in applications that require generalization or in applications where the training data cannot accurately predict decision boundaries or when the input samples are subject to noise and therefore perturb around the decision boundaries, a smooth decision around a decision boundary is desirable and more robust.

Most of the decision methodologies such as decision trees are not designed to allow for incremental update. There is no easy way to incrementally update a decision rule using new training samples after the tree is constructed. Alternatively, completely new rules are constructed when new samples are available. However, the new rules may have very different performance characteristics from the old ones. This is not desirable in critical applications where performance characteristics should be stable and update learning should change the performance characteristic gracefully.

OBJECTS AND ADVANTAGES

It is an object of this invention to provide a method for regulating the quality of decision rules automatically. Such regulation provides a balance between crisp and soft decisions and allows for the adjustment of the balancing point to match an application.

It is a further object to provide automatic optimization of decision rules using all training samples.

It is an object of the invention to allow for automatic optimization of hierarchical decision structures generated from other approaches.

It is an object of the invention to allow graceful incremental updating of decision structures using newly acquired samples from existing and new classes.

It is an object of the invention to improve regulation tree accuracy by using multiple stages of trees focusing toward the detailed decisions near decision boundaries through further stages of processing.

SUMMARY OF THE INVENTION

This invention describes new methods for regulating hierarchic decisions in intelligent systems. Storing additional statistics acquired during training for both terminal and non-terminal nodes alters a conventional decision tree structure. These statistics are used to create smooth decision boundaries with the smoothness adjustable and optimizable through the choice of sample weights and regulation parameters. Methods for trimming regulation trees and focusing them arise through selection of weights, tree depth, regulation parameters, and evaluation of accuracies obtained.

Methods for incrementally increasing the number of training samples for an already trained regulation decision tree provide graceful change to classification characteristics. Methods for construction of compound trees support the incremental addition of new trained classes and new training samples.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

This invention provides a method to regulate the quality of decision rules automatically by providing an adjustable balance between crisp and soft decisions to match an application. Methods for incremental updating of the decision structure by additional learning samples from the same classes and for adding new classes are taught. A preferred embodiment of the invention can be constructed using a decision tree hierarchical decision structure.

I. Decision Tree

A decision tree makes a decision using hierarchical decision structures implemented as a tree. (Breiman L., Friedman J. H., Olshen R. A. and Stone C. J., "Classification and Regression Trees", Chapman and Hall/CRC, 1984 pp18–58) A tree consists of at least one non-terminal node and at least as many terminal nodes as the number of decision outcomes to be decided. Each outcome has associated at least one terminal node, and the non-terminal nodes represent various collections of mixed outcomes. The root node represents the entire collection of outcomes into which a new sample may be decided.

Almost all decision trees are binary decision trees where each non-terminal node branches out into two descending nodes.

Without loss of generality, we use binary decision tree classifiers in the descriptions of this invention. Those skilled of the art should recognize that the method of this invention is applicable to other type of decision trees or other types of parametric or non-parametric decision methods.

I.1 Binary Decision Tree Classifier

Figure 2:
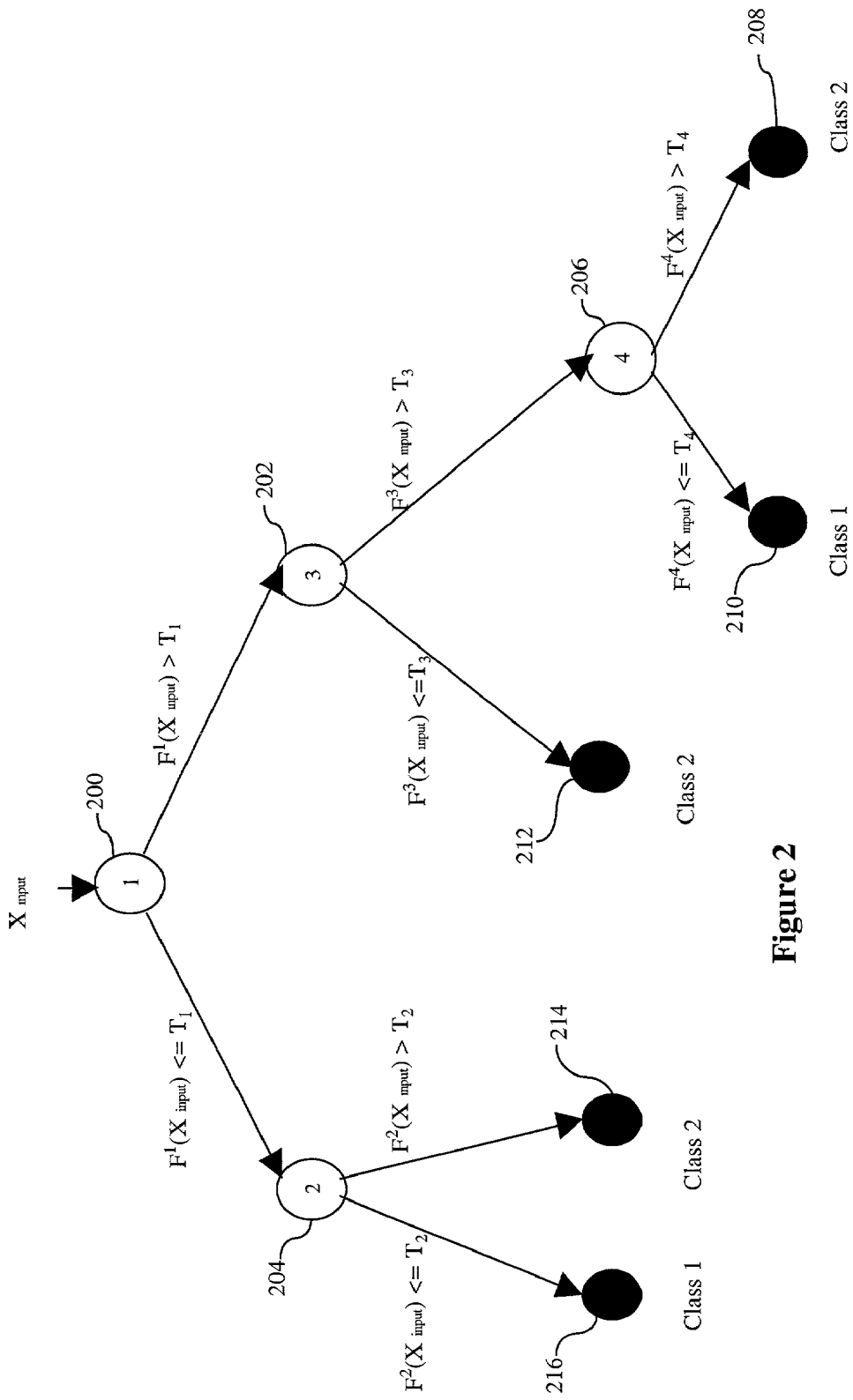
FIG. 2 shows the computational structure of a typical binary decision tree classifier.

FIG. 2 shows the computational structure for a typical binary decision tree classifier. A binary decision tree has two descendant paths for each non-terminal node. There is a decision rule associated with each non-terminal node to determine the descendant path for a sample at the node, until a terminal node is reached. The decision outcomes of a decision tree classifier are classes associated with the input data. Examples of classes include disease types, defect classifications, weather patterns, etc.

In the classification mode, an unknown sample enters the decision tree at the root node and the decision rule associated with the root node is applied to the sample's feature vector to determine the descendant path that the sample will follow. This process is repeated through descending non-terminal nodes until a terminal node is reached. Every terminal node has an associated class to which the sample is assigned.

The commonly used decision rule for each non-terminal node is a thresholding value for a discrimination function associated with the node. In one embodiment of the invention, if the node's discrimination function value is less than or equal to a threshold value, the left child is taken; otherwise, the right child is taken for the descendant path. Feature thresholding is the simplest and most easily understandable discrimination function. Other discrimination functions such as Fisher linear decision function, Bayes linear decision function, Bayes quadratic decision function and other single stage decision rules can also be used. Note that it is harder to interpret a decision tree when multiple features are involved in a discrimination function.

I.2 Binary Decision Tree Construction Procedure

Given a set of training samples, a binary decision tree can be constructed automatically by a divide and conquer procedure. All training samples are used to construct the root node. Each subsequent node is trained by a subset of the training samples. The decision tree construction procedure is as follows:

1. For a given node n with associated training sample set $U^n$, sort the samples in an ascending order according to their discrimination function values, i.e. $f(X_k^n) \leq f(X_{k+1}^n)$. In the case of a feature thresholding method, the sorting is performed for each of the available features so that both feature and threshold value selection can be accomplished simultaneously.

2. A set of candidate thresholds $T^n$ is defined by $$T^n = \left\{ \frac{f(X_k^n) + f(X_{k+1}^n)}{2} \middle| Class^{k+1} \neq Class^k \right\}$$

3. For each partition at a candidate threshold, calculate the following parameters:

the weighted number of class c samples assigned to LEFT, $N_{Lc}$, and the weighted number of class c samples assigned to RIGHT, $N_{Rc}$.

$$N_{Lc} = \sum_{i \in \text{Class\_c\_in\_LEFT}} w_i^c$$

$$N_{Rc} = \sum_{j \in \text{Class\_c\_in\_RIGHT}} w_j^c$$

Where $w_i^c$ is the weighting factor for sample i belonging to class c.

The total weighted number of samples assigned to LEFT and RIGHT by the partition:

$$N_L = \sum_{c \in LEFT} N_{Lc}$$

$$N_R = \sum_{c \in RIGHT} N_{Rc}$$

Evaluation functions to be used for the partition selection at node n include:

Purity (Entropy):

$$PR_n = \sum_{c \in \text{all\_Class\_in\_n}} (N_{Lc} \ln P_{Lc} + N_{Rc} \ln P_{Rc})$$

Where $$P_{Lc} = \frac{N_{Lc}}{N_L} \text{ and } P_{Rc} = \frac{N_{Rc}}{N_R}.$$

Purity has the maximum value when the training samples are completely separated in LEFT and RIGHT.

Another criteria that can be used for an evaluation function is the probability of correct classification 4. Select the partition for node n as the one that maximizes the evaluation function.

5. Check the following stopping criteria (OR conditions):
   Reached the maximum allowable level of tree: $L=\log_2 N-1$ or a user specified limit. Where N is the total number of training samples.
   $\chi^2$ value is smaller than an allowable limit.
   Where $$\chi^2 = \sum_{c \in all\_Class\_in\_n} N_{Lc}\ln P_{Lc} + N_{Rc}\ln P_{Rc} - N_c^n \ln \frac{N_c^n}{N^n}$$

and $N_c^n$ is the weighted number of samples of class c at node n. $N^n$ is the total weighted number of samples at node n.
   $N^n$ value is smaller than an allowed limit.
   Type I error>limit. Where type I error is the probability that a sample whose true class is in LEFT yet it is classified as RIGHT class
   Type II error>limit. Where type II error is the probability that a sample whose true class is in RIGHT yet it is classified as LEFT class
6. If none of the stopping criteria is met, assign node n as a non-terminal node and use the step 4 selected partition for this node
7. If at least one of the stopping criteria is met, assign node n as a terminal node, and assign the most probable class from its associated training samples as the classification outcome for this node.

II. Decision Tree Regulation

A typical decision tree classifier makes crisp decisions. That is, it makes decisions following a definitive path of the decision structure and assigns a class unequivocally to an input sample. This method supports discontinuous decision boundaries well and is desirable in classification applications where context switching is required around decision boundaries. However, in applications that require generalization or in applications where the training samples cannot accurately predict decision boundaries or when the input samples are subject to noise and therefore perturb around the decision boundaries, a smooth decision around the decision boundary is desirable and more robust.

This invention provides a decision tree regulation method and new decision structure that supports soft decisions. It provides a balance between crisp and soft decisions. It allows for the adjustment of the balancing point to match an application.

II.1 Regulation Tree Construction

Figure 1:
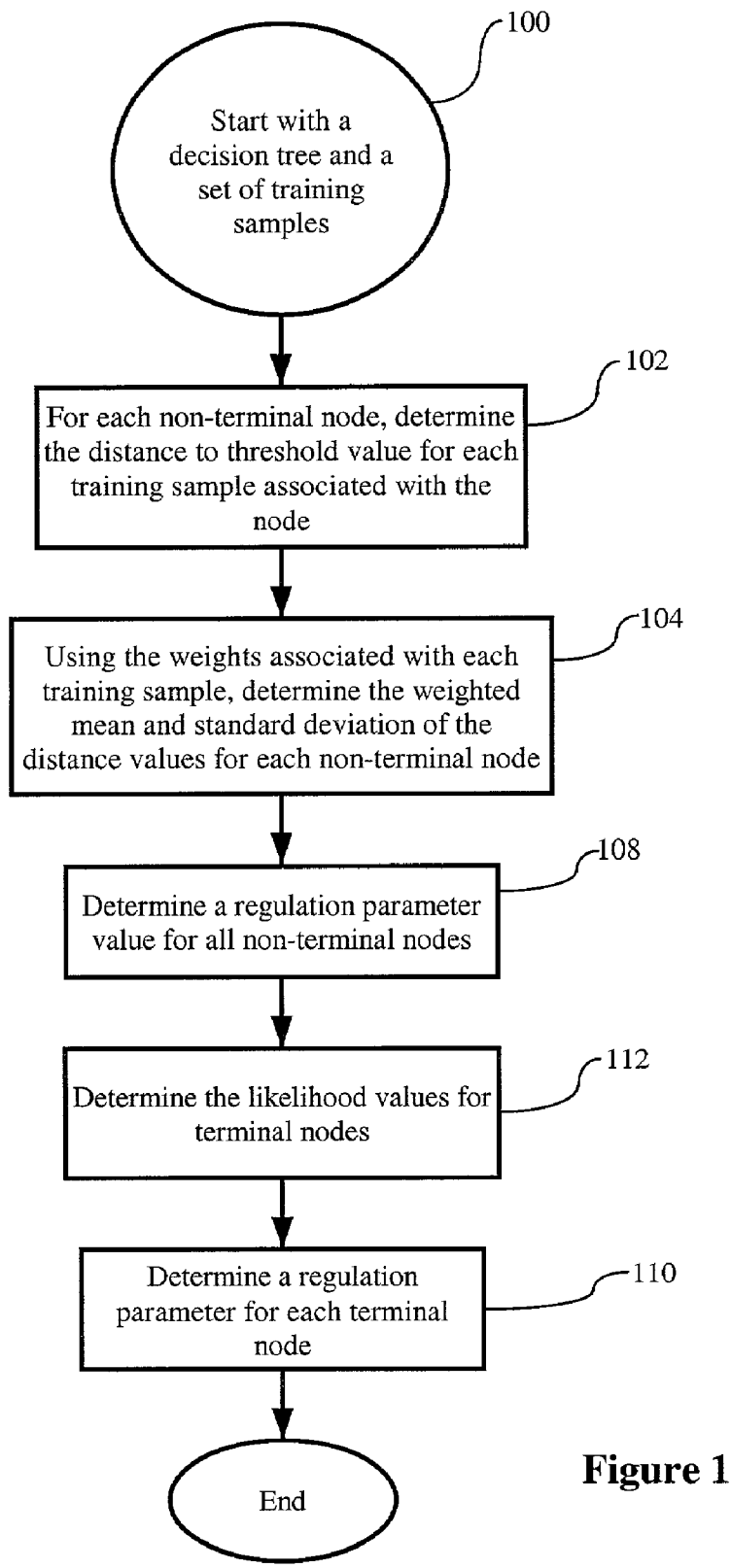
FIG. 1 shows the construction process for a regulation decision tree.

A regulation tree can be derived from an existing decision tree as shown in FIG. 1. A regulation tree has the same structure as the existing decision tree. It derives and stores additional statistics at each node. The regulation tree construction process inputs a decision tree and a set of training samples 100. In a preferred embodiment of the invention, the regulation tree construction process includes the following steps:

1. For each non-terminal node n, determine the distance-to-threshold ($d_i^n$) values for each of the training sample i associated with this node 102. The weighted mean ($\mu_d^n$) and standard deviation ($\sigma_d^n$) for the distance values are derived from the training sample distance values 104 and stored in the node for the classification of new samples. The weighting factors are the weights associated with each training sample. Weights can be associated with samples on a variety of basis such as with the confidence of representation or accuracy of data acquisition, significance to a class determination, or other emphasis criteria. Equal weights can be applied if no additional information is available. Weights can also be automatically determined by a process such as described for tree focusing in section V. In one embodiment of the invention, a simple method accumulates the weighted distance value using the following rule:

$$\text{Distance}^n(k+1) = \text{Distance}^n(k) + w_{k+1} * d^n_{k+1}$$

$$\text{Weight}^n(k+1) = \text{Weight}^n(k) + w_{k+1}$$

$$\text{SquareDistance}^n(k+1) = \text{SquareDistance}^n(k) + w_{k+1} * d^{n2}_{k+1}$$

After the accumulation of all training samples associated with each node ($N^n$), the mean distance for node n $\mu_d^n$ is determined by $$\mu_d^n = \text{Distance}^n(N^n)/\text{Weight}^n(N^n)$$

and the mean square distance for node n $s^2{}_d^n$ is determined by $$s^2{}_d^n = \text{SquareDistance}(N^n)/\text{Weight}(N^n)$$

The distance standard deviation $\sigma_d^n$ value is determined by $$\sigma_d^n = \sqrt{s_d^{2n} - (\mu_d^n)^2}$$

To avoid the problem of outliers, an alternative embodiment of the invention can be derived by ranking $d_i$ and find the weighted median value ($m_d^n$) and the range between the 10% and 90% values of the distance ($R^n{}_{10\%-90\%}$). The mean distance and the distance standard deviation can be estimated from $m_d^n$ and $R^n{}_{10\%-90\%}$ as follows:

$$\mu_d^n = m_d^n$$

$$\sigma_d^n = R^n{}_{10\%-90\%}/2.56$$

Those skilled in the art should recognize that other methods could be used to estimate the mean and standard deviation values. For example, different percentiles can be used to measure the range for the standard deviation estimation. Furthermore, the weights for each sample can all be equal to one (set equally).

2. For a terminal node n having $N^n$ weighted training samples. Denote $N_c^n$ as the weighted class c training sample count at this terminal node n. In one embodiment of the invention, the likelihood value for class c at terminal node n is determined 112 as:

$$L^n{}_{class\_c} = N_c^n/N^n$$

An alterative method for likelihood value calculation is:

$$L^n{}_{class\_c} = N_c^n/(N^n + \beta).$$

Where $\beta$ is a regulation parameter that weakens the likelihood values for terminal nodes having a small number of training samples. In a preferred embodiment there is one value of $\beta$ that is common to all terminal nodes 110. The likelihood values are stored for each terminal node of the tree.

II.2 Regulation Tree Application

Given an input sample, $X_{input}$, the likelihood values at each non-terminal node n are determined first. To determine the likelihood value for a non-terminal node n, the distance to threshold value for $X_{input}$ is calculated as:

$$d_{input}^n = f^n(X_{input}) - T^n$$

In one embodiment of the invention, the likelihood value determination process is shown in FIG. 2. In FIG. 2 non-terminal nodes 200, 202, 204, 206 are shown as clear ovals, terminal nodes 208, 210, 212, 214, 216 are blacked out ovals. The decision rule for a node n is indicated as $f^n(.)$. A threshold value for a node n is indicated as $T^n$. If distance value, $d_{input}^n$, is zero or negative, the likelihood value for descending through the left branch, $L_{left}$, is one in a crisp tree. In the regulation tree the probability that the sample could descend through the right branch is calculated by the rule as follows:

$$P_{right}^n = \int_{-\infty}^{d_{input}^n} \frac{1}{\sqrt{2\pi}\,\sigma_d^n} e^{-\frac{(v-\mu_d^n)^2}{2\sigma_d^{n2}}} \, dv$$

Figure 3:
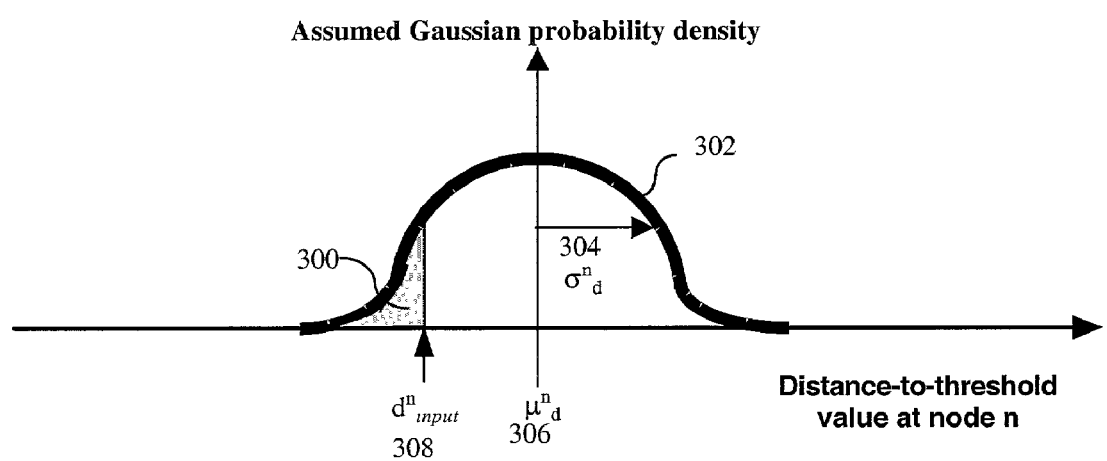
FIG. 3 shows the non-terminal node likelihood value determination process.

$P_{right}^n$ 300 is indicated diagrammatically as a shaded area in FIG. 3. FIG. 3 indicates an assumed Gaussian example probability density function separately derived for each node n from the set of training samples. The Gaussian example is used to illustrate a preferred embodiment and is not limiting. Other distribution functions or empirical models can also be used. Actual statistics at each node should be determined during training. For the example non-terminal node n having standard deviation $\sigma_d^n$ 304 and mean $\mu_d^n$ 306 wherein the area 300 under the probability density curve 302 is a function of the distance to threshold $d_{input}^n$ 308. The probability of being a sample that should descend through the left branch is:

$$P_{left}^n = 1 - P_{right}^n$$

The likelihood value, $L_{left}$, of the regulation tree for descending through the left branch can be calculated as a linear combination of the crisp tree value (i.e. 1) and $P_{left}^n$ by a regulation parameter $\alpha$. That is, $$L_{left}^n = 0.5 + \alpha + (0.5 - \alpha)P_{left}^n$$

and $$L_{right}^n = 1 - L_{left}^n$$

In a preferred embodiment there is the same value of $\alpha$ for every non-terminal node in the regulation decision tree 108. If distance value, $d_{input}^n$, is positive, the likelihood value for descending through the left branch, $L_{left}^n$, and the likelihood value for descending through the right branch, $L_{right}^n$, can be similarly determined.

Note that the $\alpha$ value regulates an adjustable condition between the crisp tree and the probabilistic tree. When $\alpha=0.5$, the tree reverts to the original crisp tree. When $\alpha=0$, the tree averages the original crisp tree and a complete probabilistic tree with equal weight. When $\alpha=-0.5$, the tree is a complete probabilistic tree.

Since a sample ($X_{input}$) most likely has non-zero branch likelihood values for each of the terminal nodes, in the preferred embodiment of the invention the confidence value corresponds to class c for $X_{input}$, $Confidence_c(X_{input})$, is (see also FIG. 4):

$$Confidence_c(X_{input}) = \sum_{j \in terminal\_nodes} \prod_{s \in branches\_to\_j} L^s(X_{input}) L_{class\_c}^j$$

Figure 4:
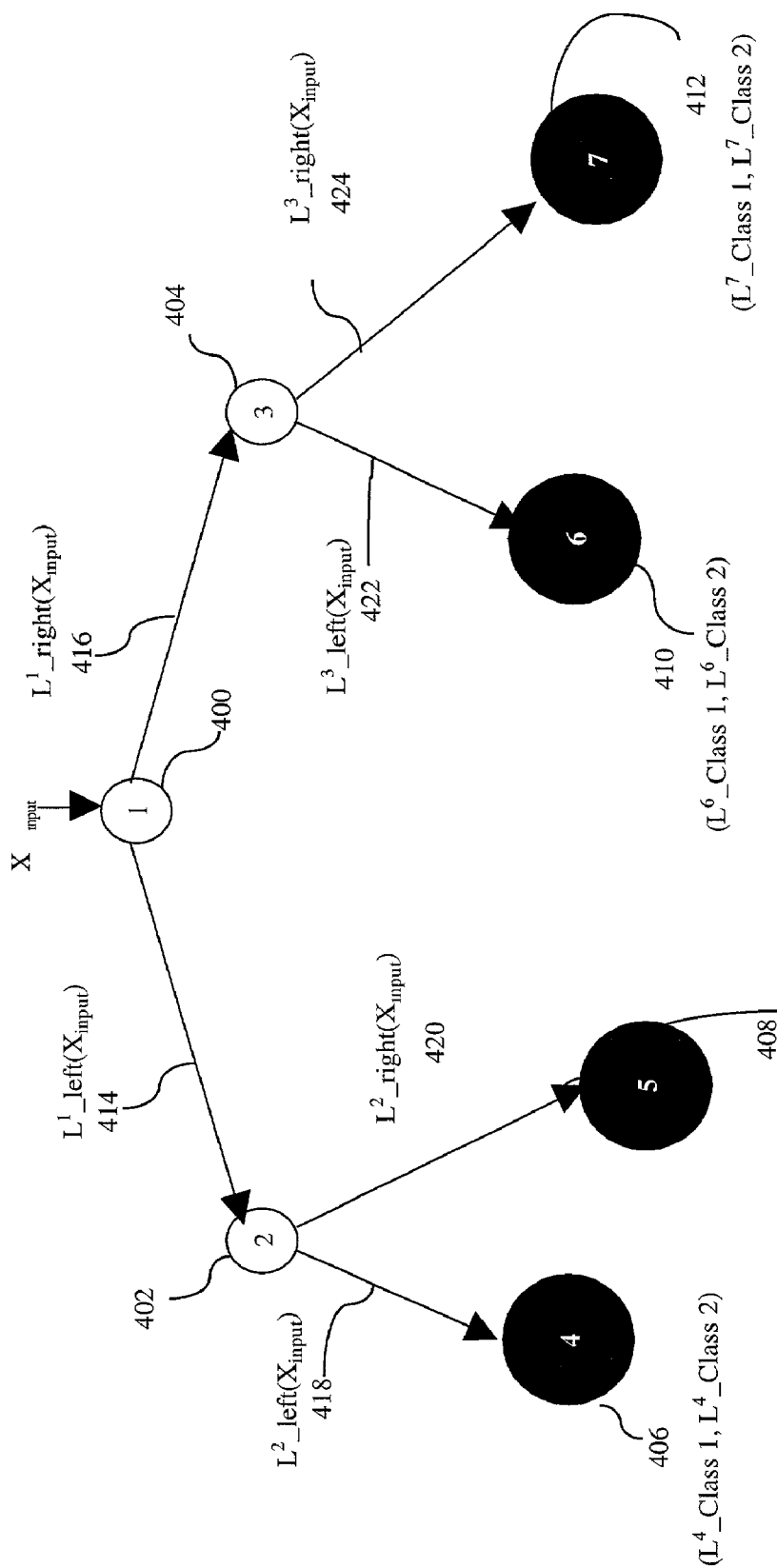
FIG. 4 shows a regulation tree with its associated likelihood values for an input sample $X_{input}$.

FIG. 4 shows the example data for confidence determination diagrammatically for a tree having 3 non-terminal nodes 400, 402, 404 and 4 terminal nodes 406, 408, 410, 412 for classifying input samples into two classes, Class1 or Class2. For any input sample $X_{input}$ the likelihood values that it will pass down any branch of the tree can be determined as illustrated in Section II.2. For example, in FIG. 4 the likelyhood that it will pass down branch 414 has been determined to be $L^1\_left(X_{input})$. In the FIG. 4 example, these likelihood determinations are labeled for each branch of the tree for the particular input sample. Determine that the new sample $X_{input}$ is in a particular class as:

Confidence_class1 $(X_{input}) = L^4\_class1 * L^2\_left(X_{input})$
  $* L^1\_left(X_{input}) + L^5\_class1 * L^2\_right(X_{input})$
  $* L^1\_left(X_{input}) + L^6\_class1 * L^3\_left(X_{input})$
  $* L^1\_right(X_{input}) + L^7\_class1 * L^3\_right(X_{input})$
  $* L^1\_right(X_{input})$ Confidence_class2 $(X_{input}) = L^4\_class2 * L^2\_left(X_{input})$
  $* L^1\_left(X_{input}) + L^5\_class2 * L^2\_right(X_{input})$
  $* L^1\_left(X_{input}) + L^6\_class2 * L^3\_left(X_{input})$
  $* L^1\_right(X_{input}) + L^7\_class2 * L^3\_right(X_{input})$
  $* L^1\_right(X_{input})$ where the likelihood value for each class is known for each of the terminal nodes and depicted for node 4 (406) as $L^4\_Class1$ and $L^4\_Class2$, node 5 (408) as $L^5\_Class1$ and $L^5\_Class2$, node 6 (410) as $L^6\_Class1$ and $L^6\_Class2$ and node 7 (412) as $L^7\_Class1$ and $L^7\_Class2$. The associated Likelihood values determined for a particular input sample $X_{input}$ that are referred to in the equations above are $L^1\_left(X_{input})$ (414), $L^1\_right(X_{input})$ (416), $L^2\_left(X_{input})$ (418), $L^2\_right(X_{input})$ (420), $L^3\_left(X_{input})$ (422), $L^3\_right(X_{input})$ (424).

II.3 Automatic Tree Regulation Process

Figure 5:
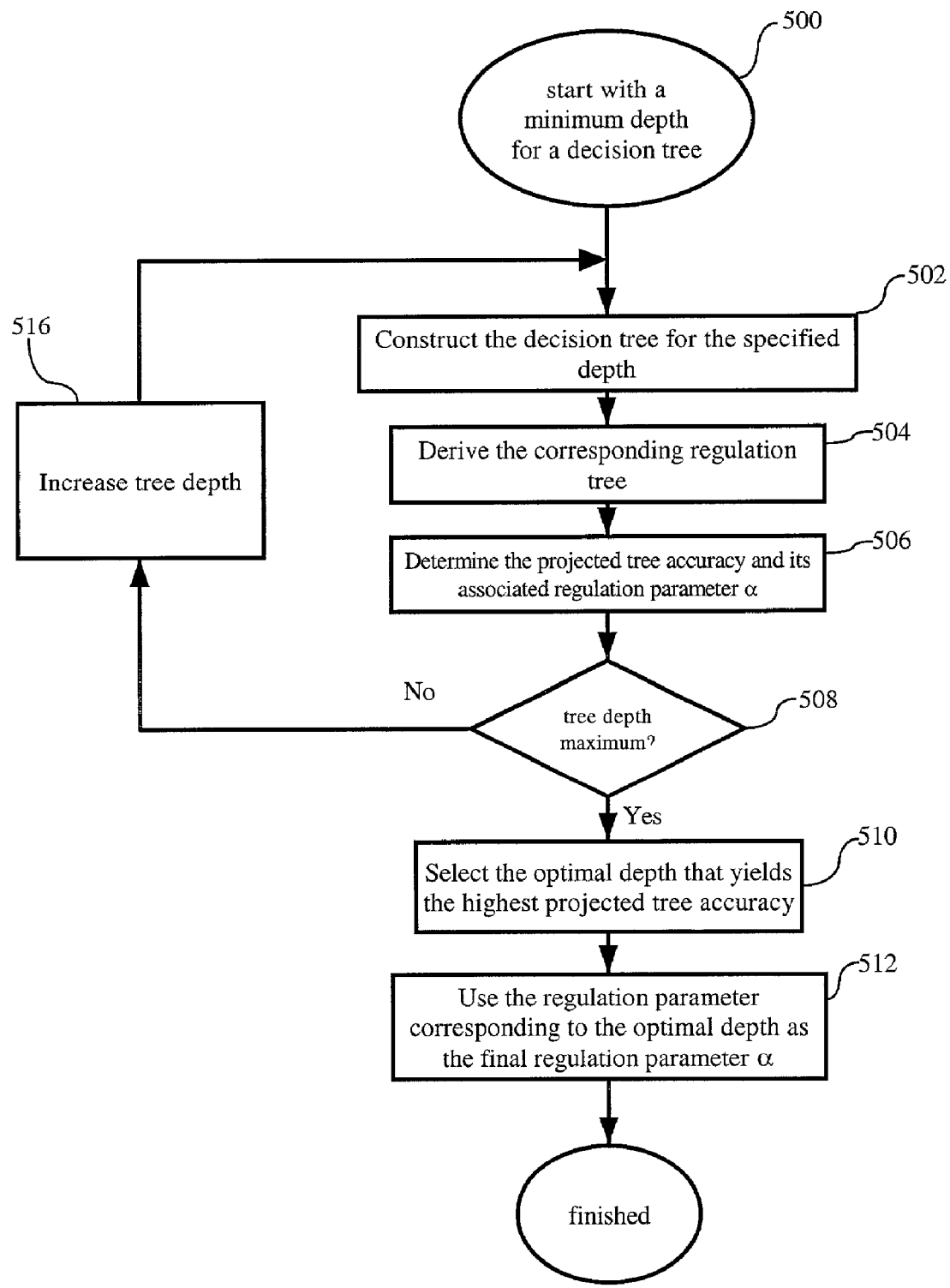
FIG. 5 shows the process for automatically determining the appropriate depth of a tree and the appropriate regulation parameter.

The recursive partitioning method of constructing a decision tree often results in a very complex tree that over-fits the data. To automatically determine the appropriate depth of a tree and the appropriate regulation parameter $\alpha$, this invention includes a tree regulation process. In one embodiment of the invention, the process (also shown in FIG. 5) is described in the following steps:

1. From the minimum allowable tree depth 500 to the maximum allowable tree depth 508, 516
   a. Construct a decision tree up to the given depth 502
   b. Derive the corresponding regulation tree 504
   c. Determine the projected tree accuracy and its associated regulation parameter $\alpha$ value 506
2. Select the optimal depth that yields the highest projected tree accuracy 510
3. Use the regulation parameter value corresponding to the optimal depth as the final regulation parameter $\alpha$ value 512

In the preferred embodiment of the invention, determine the projected tree accuracy for a regulation tree for all training samples at $\alpha$ values ranging from 0 through 0.5 in 0.05 increments. For a given tree depth d, this results in accuracy values $A_0^d$, $A_{0.05}^d$, $A_{0.1}^d$, through $A_{0.5}^d$. Accuracy is calculated for a particular tree depth and $\alpha$ as follows:

$$A_\alpha^d = \frac{\sum_{\forall K \in Correct} w_K W_{CK}}{\sum_{\forall K \in Correct} w_K W_{Ck} + \sum_{\forall j \in incorrect} w_j W_{Cj}}$$

$C_i$ is defined to be the true class of a sample i. The accuracy values are determined using the result for classification of samples combined using their sample weighting values ($W_i$) and including global class weights ($W_{Ci}$) for emphasis of particular classes within the accuracy classification. Those skilled in the art should recognize that $W_{Ci}$ can be set to an equal value (or 1) for all classes. In the preferred embodiment of the invention, the projected tree accuracy $A^d$ is calculated as:

$$A^d = \mu_A^d - R^d/9$$

Where $\mu_A^d$ is the trim mean (i.e. trim 2 outliers from the 11 $A_\alpha^d$ values) of the 9 medium $A_\alpha^d$ values and $R^d$ is the range of the remaining 9 medium $A_\alpha^d$ values.

An alternative embodiment of the invention, the projected tree accuracy $A^d$ can be calculated as:

$$A^d = \mu_A^d - R^d/9(1+t(d-d_{min})/d_{max}-d_{min}))$$

Where $d_{min}$ is the minimum allowable depth, $d_{max}$ is the maximum allowable depth, and t is a parameter that penalizes deeper trees. In the preferred embodiment of the invention, 0.1 is used for t. Other values can be used in alternative embodiments. The $\alpha$ whose $A_\alpha^d$ value is closest to $A^d$ is selected as the regulation parameter for the regulation tree at depth d.

III. Regulation Tree Update Learning

There is no easy way to incrementally update a decision tree classifier using new training samples after the tree is constructed. However, computer speed and storage capability have improved dramatically so that it has become practical to store all training samples and reconstruct a new tree using old and new samples when new samples are available. However, the new tree may have very different performance characteristics for certain types of samples after it is re-built. This is not desirable in critical applications where performance characteristics should be well understood and updated learning should only change this characteristic gracefully. The regulation tree methodology of this invention offers the unique advantage of graceful incremental update for the classifier. Using new samples from existing classes, regulation tree statistics can be incrementally updated to gracefully optimize performance for new samples. Both terminal node and non-terminal node statistics can be updated by the new samples of existing classes. When new samples are from new classes, a compound tree structure can be constructed to handle new classes yet maintain stable performance to samples from existing classes.

III.1 Terminal Node Update for New Samples from Existing Classes

Figure 7:
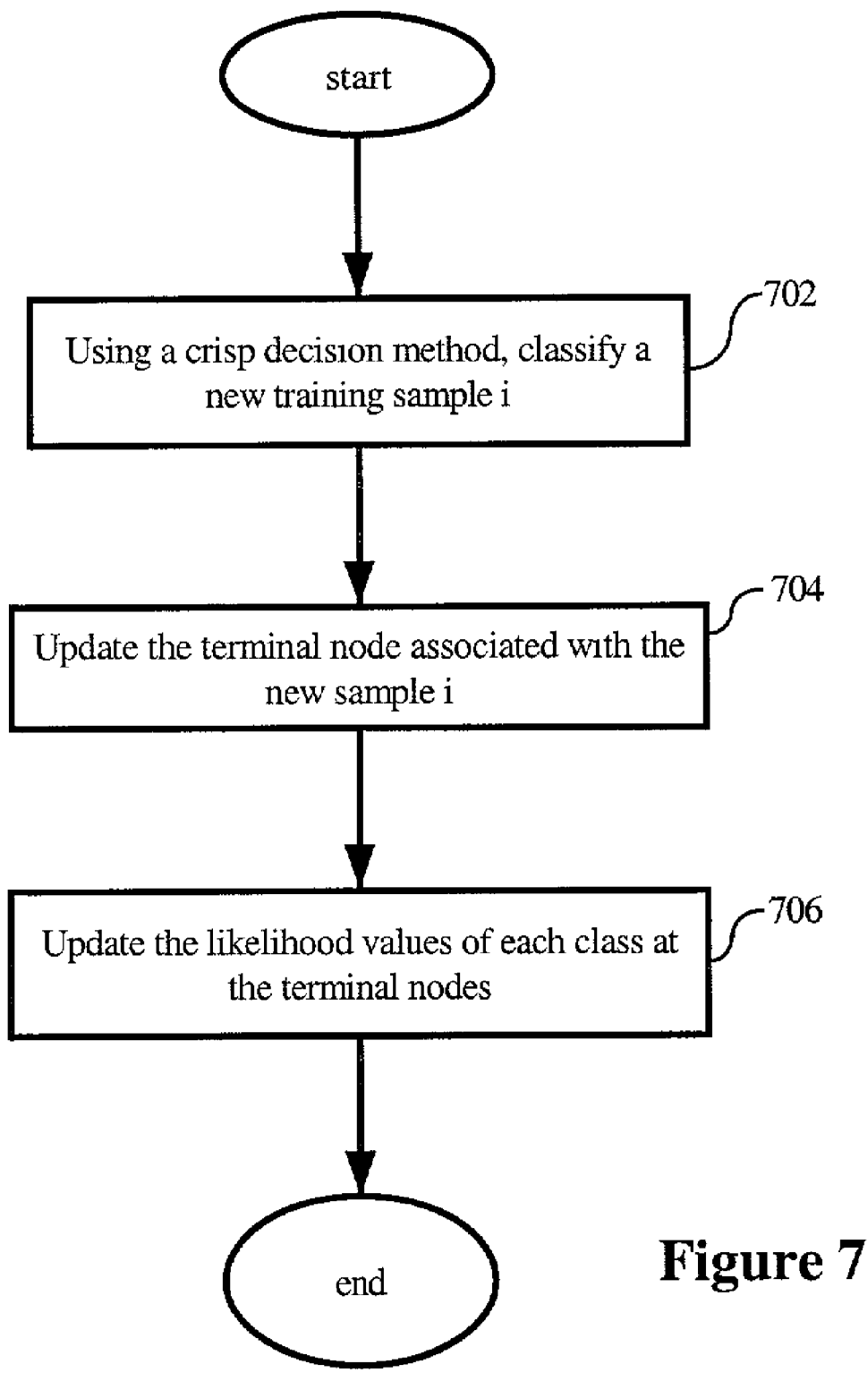
FIG. 7 shows regulation tree incremental updating with new samples.

FIG. 7 shows the steps involved in updating the terminal nodes for new samples from existing classes. To facilitate updated learning, the total weighted training sample count, $N^n$, and the weighted training sample counts for each class c, $N_c^n$, are stored in each terminal node. To update the terminal node statistics, a new training sample i is classified using a crisp decision method (702). Therefore, only one terminal node result is associated with the new training sample. Let the true class of the new training sample i be c and its associated terminal node be n. In one embodiment of the invention, the terminal node update process updates only terminal node n. $N^n$ and $N_c^n$ are updated by the following rules (704):

$$N^n = N^n + w_i$$

and $$N_c^n = N_c^n + w_i$$

After updating, the terminal node likelihood values of each class are updated using the rules disclosed in section II.1.2 (706).

III.2 Non-Terminal Node Update for New Samples from Existing Classes

Given a new training sample i, each non-terminal node visited by the new training sample when using the crisp decision method should be updated. To support the update, the accumulated distance (Distance), weight (Weight) and square distance (SquareDistance) values or a weighted distance histogram are stored at each non-terminal node of the regulation tree.

To update a non-terminal node n, determine the distance-to-threshold $(d_j)^n$ values for the training sample i. In the case of $Distance^n$, $Weight^n$ and $SquareDistance^n$ approach, the $Distance^n$, $Weight^n$ and $SquareDistance^n$ values are updated as follows:

$$Distance^n(new) = Distance^n(old) + w_i * d_i^n$$

$$Weight^n(new) = Weight^n(old) + w_i$$

$$SquareDistance^n(new) = SquareDistance^n(old) + w_i * d_i^{n2}$$

The updated distance weighted mean ($\mu^n_{di}$) and standard deviation ($\sigma^n_{di}$) are:

$$\mu^n_d = Distance^n(new)/Weight^n(new)$$

$$s^{n2}_d = SquareDistance^n(new)/Weight^n(new)$$

$$\sigma^n_d = \sqrt{s^{n2}_d - (\mu^n_d)^2}$$

In the case of a weighted distance histogram approach, the weighted histogram is updated by the new sample $d_i^n$ and $w_i$. In one embodiment of the invention, the weighted median point ($m^n_d$) and the range between the 10% and 90% values of the distance ($R^n_{10\%-90\%}$) can be determined from the updated histogram. The mean distance and the distance standard deviation are updated as follows:

$$\mu^n_d = m^n_d$$

$$\sigma^n_d = R^n_{10\%-90\%}/2.56$$

III.3 Regulation Tree Update for New Classes

In this invention new samples from new classes are incorporated by creating a compound regulation tree structure. This new structure (shown in FIG. 6) provides graceful update of the overall classifier yet maintains stable performance for the existing classes. The compound regulation tree structure includes multiple trees that are trained from an expanding training data base 600 that includes old and new training samples. The first tree 602 is the original regulation tree that is subject only to terminal and non-terminal node update learning of new samples from existing classes. The other trees 604, 608, 610, 612 correspond to new classes that are sequentially trained into the decision system through new class addition. Each added tree incorporates a new class.

Figure 6:
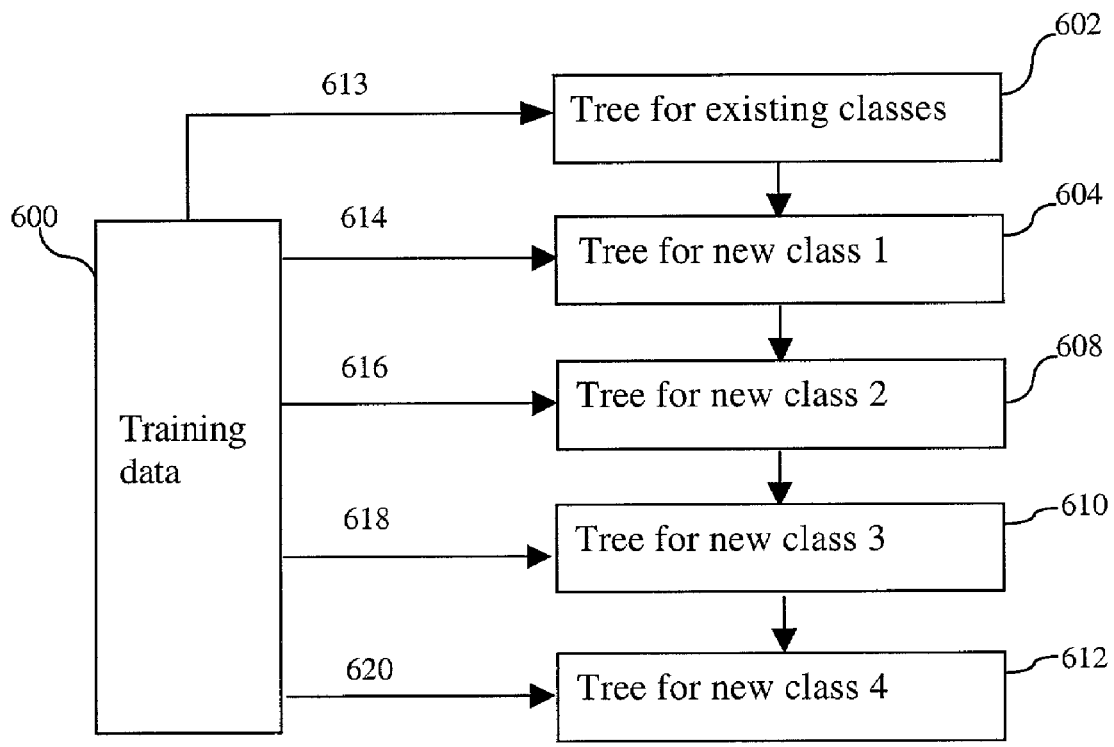
FIG. 6 shows the compound tree new tree construction flow.

The preferred embodiment for new class update learning flow is shown in FIG. 6. FIG. 6 assumes four new classes are update learned into the compound regulation tree structure.

III.3.1 New Tree Construction

Update learning of the first new class (new class 1) triggers the generation of the second tree 604 using the samples available for the new class 1 update learning along with the existing training data.

In one embodiment of the invention, to enable new tree construction, the system stores all training data with their weights 600. For new samples from new classes, the system appends the samples with their class label into the training data. The system checks the new class sample size. If the sample size is greater than the minimal required sample size for a new class, a new tree is constructed for all existing classes and the new class.

Similarly, trees are generated for new class 2 608 through new class 4 612 as shown in FIG. 6.

III.3.2 Compound Tree Update

For a compound tree with 4 new classes, a sample belonging to the original classes will update all trees 613, 614, 616, 618, 620. A sample from new class 1 will update all trees except for the tree for original classes 614, 616, 618, 620. A sample from new class 2 will update all trees except for the tree for original classes and the tree for new class 1 616, 618, 620. Similarly, a sample from new class 3 will update the tree for new class 3 and the tree for new class 4 618, 620. A sample from new class 4 will update only the tree for new class 4 620. In one embodiment of the invention, the same terminal and non-terminal node update methods as described in sections III.1 and III.2 are used for the update.

III.3.3 Compound Tree Application

Figure 8:
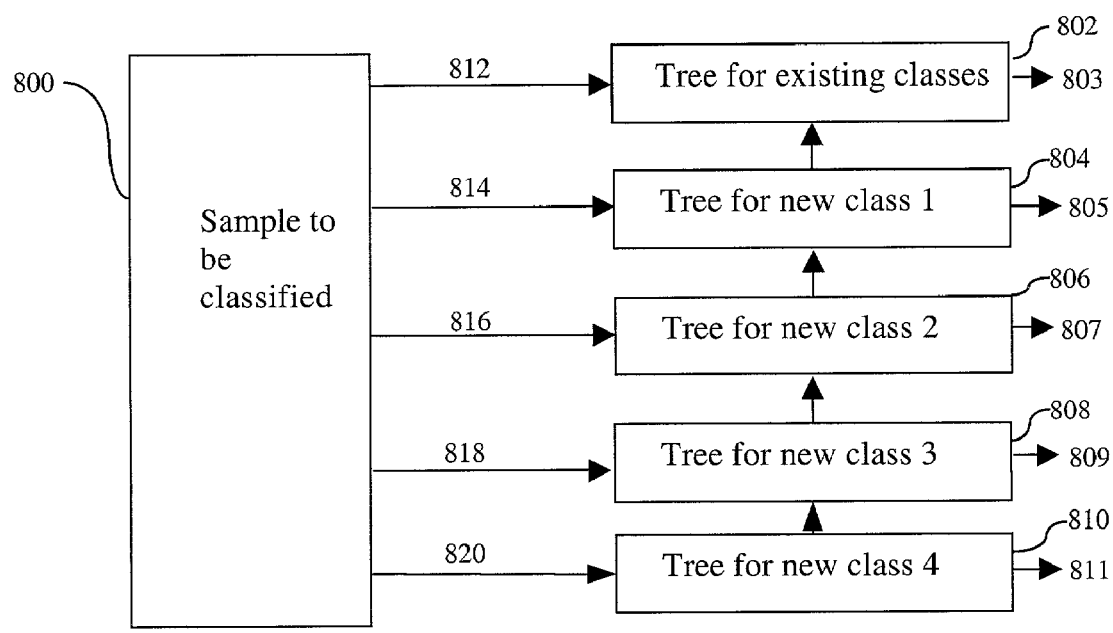
FIG. 8 shows a compound tree classification flow and confidence calculation.

The compound tree classification flow is shown in FIG. 8. In this preferred embodiment, trees for 4 new classes are generated with a total of 5 trees 802, 804, 806, 808, 810. For a sample 800 to be applied, all trees are applied and the results are combined. To combine the results from all trees, the resulting confidence value for new class4 (C4) 811 from the tree for new class4 is used as the confidence value for new class4. The resulting confidence value for new class3 (C3) from the tree for new class3 times (1−C4), i.e. (1−C4)C3, 809 is used as the confidence value for new class3. Similarly, the resulting confidence value for new class2 (C2) from the tree for new class2 times (1−C4)(1−C3), i.e. (1−C4)(1−C3)C2, 807 is used as the confidence value for new class2. The resulting confidence value for new class1 (C1) from the tree for new class1 times (1−C4)(1−C3)(1−C2), i.e. (1−C4)(1−C3)(1−C2)C1, 805 is used value for new class1. Finally, the resulting confidence value for an original classi(ci) from the tree for existing classes times (1−C4)(1−C3)(1−C2)(1−C1), i.e. (1−C4)(1−C3)(1−C2)(1−C1)ci, 803 is used as the confidence value for an original classi.

IV. Regulation Tree Pruning

To avoid the over-fitting of data, a decision tree is often pruned (Quinlan, J. Ross, "Programs for Machine Learning", Morgan Kaufmann 1993 pp 35–42). Discarding one or more sub-trees and replacing them with terminal nodes usually simplify decision trees. The class associated with a terminal node is the one with the most frequent (after weighting) class from the training samples. In the prior art approach there are two methods of tree pruning: Cost-complexity pruning and Reduced-error pruning. These methods evaluate the error criteria for the samples that fall into a non-terminal node that precedes a pair of terminal nodes. If the error criteria result is in favor of the combined nodes, the sub-tree is pruned. These methods perform pruning using partial data and are not reliable due to data variations.

Figure 9:
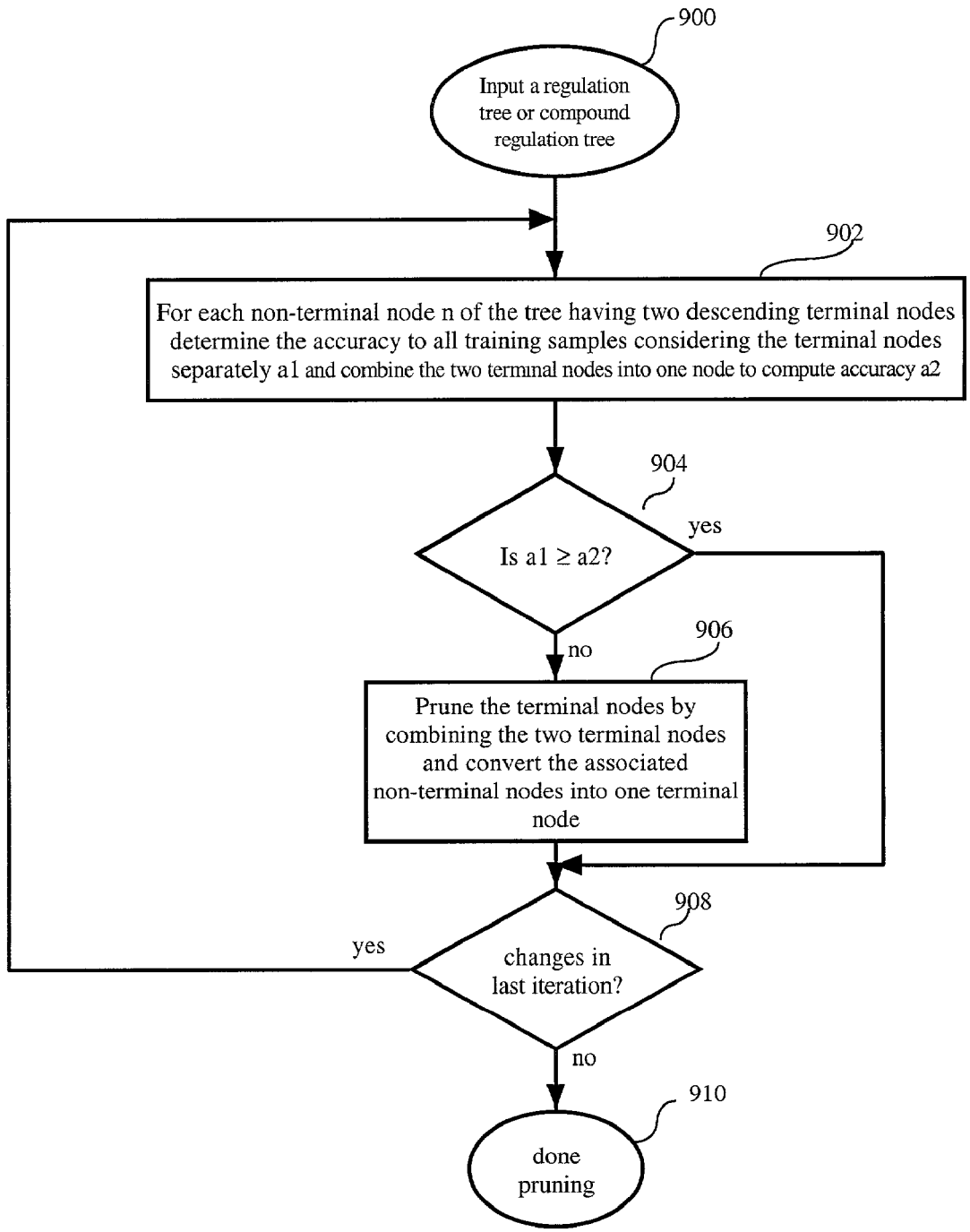
FIG. 9 shows a method for pruning a regulation tree.

In the preferred embodiment of this invention, tree pruning is accomplished by the regulation tree method. The regulation tree method uses all training samples to determine the tree pruning status for each sub-tree. This better use of the training data usually achieves more robust results. As shown in FIG. 9, the regulation tree pruning procedure includes the following steps:

1. Beginning with a regulation tree or compound regulation tree 900;
2. For each non-terminal node of the tree having two descending terminal nodes,
   a. Determine the accuracy to all training samples under the following two conditions 902:
      i. Consider the two terminal nodes separately and result in accuracy a1
      ii. Combine the two terminal nodes into one node and result in accuracy a2;
   b. If a1>a2, no pruning of the terminal node pairs 904;
   c. Otherwise, prune the terminal nodes by combing the two terminal nodes and converting the associated non-terminal nodes into one terminal node as follows 906:
      Total sample count: $N^{combine}=N^{first\_node}+N^{second\_node}$
      and For each class c, update sample count by $N_c^{combine}=N_c^{first\_node}+N_c^{second\_node}$
3. If changes occur in the previous iteration, repeat process 1 908. Otherwise, the pruning process is completed 910. Those skilled in the art should recognize that the pruning procedure can be conducted on a subset of tree nodes. Therefore, Step 3 may not have to be carried out.

V. Focusing Tree

Boosting is a technique for improving the performance of learning algorithms by manipulating the distribution of the training examples. (Freund, Y., R. E. Schapie, Iyer, R., Singer, Y. 1998 "An Efficient Boosting Algorithm for Combining Preferences", Machine Learning: Proceedings of the Fifteenth International Conference 1998).

In a preferred embodiment, regulation tree accuracy is improved by multiple stages of trees focusing toward the detailed decisions near the decision boundaries through further stages of processing. This is accomplished by increasing weights to the training samples that are close to decision boundaries and decreasing weights for samples that are far away from the decision boundaries and also by constructing an additional regulation tree (called a focusing tree) using the new weights.

In a preferred embodiment of the invention, the discrimination merit of a regulation tree to an input sample $X_{input}$ of class c is calculated as $$d_M(X_{input}) = \frac{Confidence_c(X_{input})}{Confidence_m(X_{input}) + t}$$

Where $\text{Confidence}_c(X_{input})$ is the confidence value for the correct classification as class c. $\text{Confidence}_m(X_{input})$ is the highest confidence value for an incorrect classification and m is the class corresponding to the incorrect classification. t is set to 0.001 in a preferred embodiment of the invention.

A weight update factor $K_{input}$ is determined as $$K_{input} = \text{MAX}\left(K_{low}, \text{MIN}\left(K_{high}, \frac{1}{d_M(X_{input})}\right)\right)$$

Where $K_{low}$ and $K_{high}$ are the lower and upper bounds of the weight update factor. The weight for the sample $X_{input}$ is adjusted by the following rule:

$$w_{input}(\text{new}) = K_{input} * w_{input}(\text{old})$$

Figure 10:
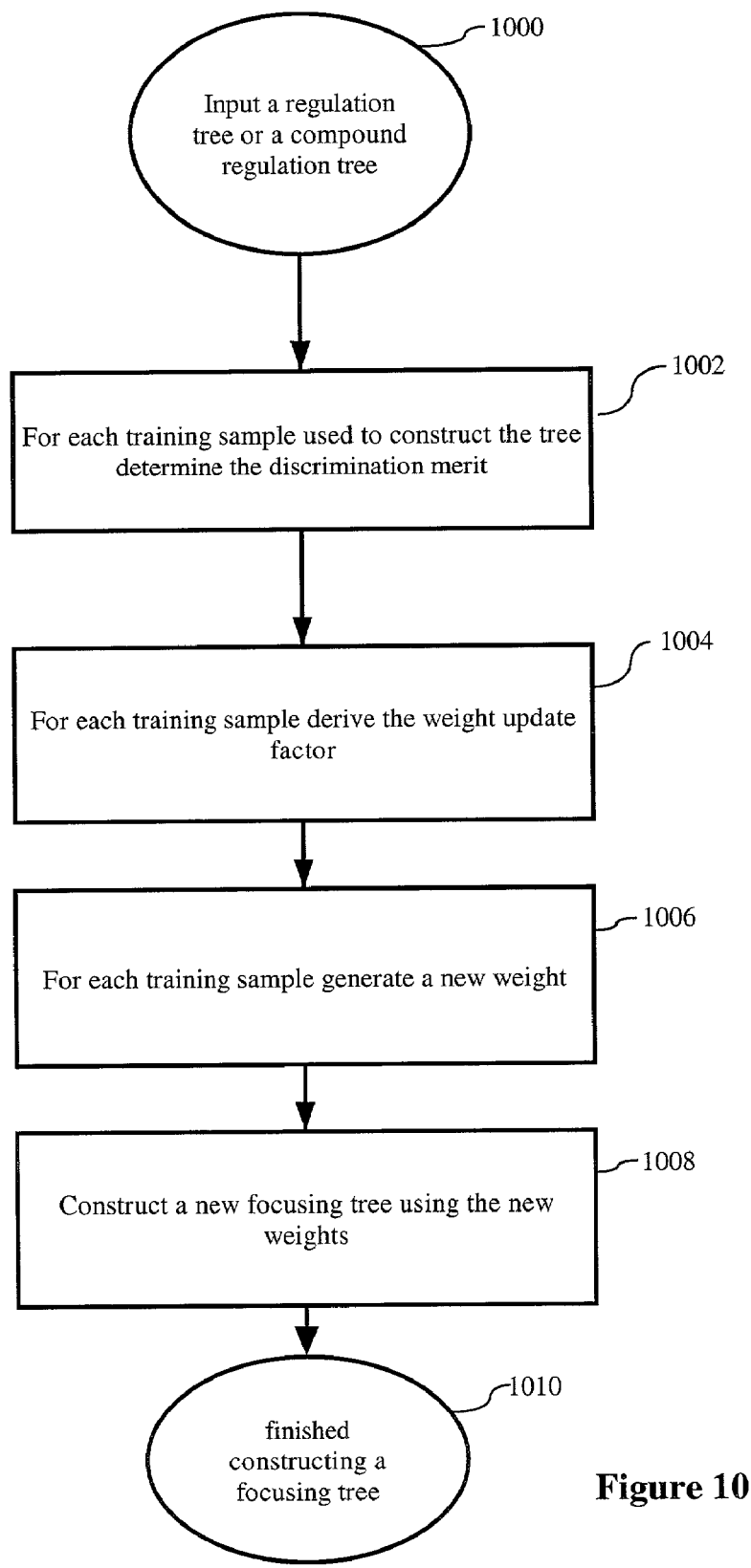
FIG. 10 shows a method for constructing a focusing tree from a regulation tree.

In a preferred embodiment of the invention, a focusing tree of a regulation tree is generated by the following procedure (see FIG. 10):
1. Starting with a regulation tree or a compound regulation tree having training samples 1000;
2. For each training sample,
   a. determine its discrimination merit 1002
   b. derive the weight update factor 1004
   c. generate the new weight 1006
3. Generate a new regulation tree using the new weight 1008 of all training samples. This is the focusing tree 1010

The process can be repeated to generate multi-stage focusing trees.

In a preferred embodiment of the invention, the classification reliability of a regulation tree to an input sample $X_{input}$ is calculated by $$cr(X_{input}) = \frac{\text{Confidence}_{c1}(X_{input})}{\text{Confidence}_{c2}(X_{input}) + p}$$

Where class c1 yields the highest confidence value and class c2 yields the second highest confidence value for $X_{input}$. p is set to 0.001 in a preferred embodiment of the invention.

In the application phase of a two-stage focusing tree, the following procedure applies:
1. Classify the input sample by the first regulation tree
2. If the classification reliability>threshold, use the current result as the final result and stop
3. Else, Classify the input sample by the second (focus) regulation tree and use the new result as the final result This process is repeated multiple times for multi-stage focusing trees.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different classifiers and devices, and that various modifications, both as to the classification details and operating procedures, can be accomplished without departing from the scope of the invention itself.

What is claimed is:

1. A computerized method for regulation tree construction derived from an existing decision tree having the same structure as the existing decision tree in intelligent system applications to regulate the quality of the decision rules automatically comprising the following steps:
   (a) Means for inputting an existing decision tree;
   (b) Means for inputting a set of training samples;
   (c) Means for determining distance-to-threshold statistics from the training samples for at least one non-terminal node and storing in the decision tree structure;
   (d) Means for determining likelihood value statistics from the training samples for at least one terminal node and storing in the decision tree structure;
   (e) Means for selecting regulation parameters for adjustment between the crisp tree and the probabilistic tree and for weakening the likelihood values for terminal nodes having a small number of training samples.

2. A computerized regulation tree application method in intelligent system applications to regulate the quality of the decision rules automatically comprises the following steps:
   (a) Means for inputting a sample;
   (b) Means for determining the likelihood values for at least one non-terminal node using the distance to threshold value for the input same and the probability density function for the at least one non-terminal node;
   (c) Means for determining the likelihood value for a branch to at least one terminal node by multiplying the likelihood values of all non-terminal nodes in the branch;
   (d) Means for determining the confidence value for at least one class by summing over all terminal nodes with their multiplication of non-terminal node branch likelihood values and the likelihood value for a class c at terminal node using the following formula:

$$\text{Confidence}_c(X_{input}) = \sum_{j \in \text{terminal\_nodes}} \prod_{s \in \text{branches\_to\_}j} L^S(X_{input}) L^j_{\text{class\_c}}.$$

3. A computerized regulation tree non-terminal node update learning method in intelligent system applications to regulate the quality of the decision rules automatically comprises the following steps:
   (a) Means for inputting a training sample;
   (b) Means for inputting the true class of the training sample;
   (c) Means for classifying the input training sample using a crisp decision method to determine its association with at least one non-terminal node;
   (d) Means for updating non-terminal node distance-to-threshold statistics using accumulated distance, accumulated weight and accumulated square distance.

4. The method of claim 3 wherein the non-terminal node distance-to-threshold statistics include weighted distance histogram.

5. A computerized regulation tree update learning method for new classes in intelligent system applications to regulate the quality of the decision rules automatically comprises the following steps:
   (a) Means for performing new regulation tree construction in addition to the original regulation tree to form a compound tree structure including multiple trees that are trained from an expanding training data base of old and new training samples. The first tree is the original regulation tree and the other trees correspond to new classes that are sequentially trained into the decision system through new class addition. Each added tree incorporates a new class;

(b) Means for performing a compound tree update wherein a sample from new class updates all trees except for the trees constructed before the class is introduced.

6. A computerized compound tree application method in intelligent system applications to regulate the quality of the decision rules automatically comprises the following steps:
(a) Means for inputting a sample to be applied;
(b) Means for applying the sample to all trees;
(c) Means for combining the results from all trees wherein the resulting confidence value is calculated by the following steps:
  (i) For a new class, the confidence value from the tree is used as the resulting confidence value,
  (ii) For an old class, the confidence value from the tree multiplies 1 minus the confidence values from each of the newer classes is the resulting confidence value.

7. A computerized focusing tree construction method in intelligent system applications to regulate the quality of the decision rules automatically comprises the following steps:
(a) Means for inputting a set of training samples;
(b) Means for generating a new weight for each training sample consisting of the following steps:
  (i) Determining the sample's discrimination merit using confidence ratio between the correct classification and the highest confidence value for an incorrect classification;
  (ii) Deriving the sample's weight update factor using the sample's discrimination merit;
  (iii) Generating the new weight for the sample using the weight update factor;
(c) Means for generating a new tree using the sample and the new weight.

* * * * *